(12) United States Patent
Stewart

(10) Patent No.: US 10,624,193 B1
(45) Date of Patent: *Apr. 14, 2020

(54) NODE AND METHOD OF CONTROLLING DEVICES CONNECTED TO NODE

(71) Applicant: Dwight L. Stewart, Johnston, IA (US)

(72) Inventor: Dwight L. Stewart, Johnston, IA (US)

(73) Assignee: IGOR, INC., Johnston, IA (US)

( * ) Notice: Subject to any disclaimer, the term of this patent is extended or adjusted under 35 U.S.C. 154(b) by 49 days.

This patent is subject to a terminal disclaimer.

(21) Appl. No.: 15/671,992

(22) Filed: Aug. 8, 2017

Related U.S. Application Data

(63) Continuation of application No. 14/801,522, filed on Jul. 16, 2015, now Pat. No. 9,730,299.

(51) Int. Cl.
*H05B 37/02* (2006.01)
*H05B 47/185* (2020.01)
*H05B 33/08* (2020.01)
*H05B 47/10* (2020.01)
*H05B 47/16* (2020.01)
*H05B 45/20* (2020.01)

(52) U.S. Cl.
CPC .......... *H05B 47/185* (2020.01); *H05B 33/08* (2013.01); *H05B 47/10* (2020.01); *H05B 47/16* (2020.01); *H05B 45/20* (2020.01); *Y02B 20/42* (2013.01)

(58) Field of Classification Search
CPC ................ H05B 37/0263; H05B 37/0281
USPC ................ 315/185 R, 291, 312, 318
See application file for complete search history.

(56) References Cited

U.S. PATENT DOCUMENTS

| | | | |
|---|---|---|---|
| 2004/0160199 A1* | 8/2004 | Morgan | A01M 1/04 315/312 |
| 2010/0181938 A1* | 7/2010 | Boleko Ribas | H05B 47/105 315/312 |
| 2012/0229048 A1* | 9/2012 | Archer | G08C 17/02 315/297 |
| 2016/0185288 A1* | 6/2016 | Kuang | H05B 33/0803 315/77 |
| 2016/0381763 A1* | 12/2016 | Loeb | H05B 37/0227 315/297 |
| 2017/0208658 A1* | 7/2017 | Yseboodt | H05B 33/0842 |

* cited by examiner

*Primary Examiner* — Tung X Le
(74) *Attorney, Agent, or Firm* — David M. Breiner; BrownWinick Law Firm

(57) ABSTRACT

Example embodiments relate to a node and a method of controlling devices connected to the node. In example embodiments the devices may be, but are not required to be, lights.

13 Claims, 4 Drawing Sheets

PRIOR ART

NODE AND METHOD OF CONTROLLING DEVICES CONNECTED TO NODE

BACKGROUND

1. Field

Example embodiments relate to a node and a method of controlling devices connected to the node. In example embodiments the devices may be, but are not required to be, lights.

2. Description of the Related Art

Power over Ethernet (PoE) describes a system in which power and data are provided to a device via Ethernet cabling. FIG. 1, for example, illustrates a system 90 utilizing PoE. In FIG. 1 the system 90 includes three powered devices 50, 60, and 70 which may receive power and data from a switch 20. Typical examples of powered devices include IP cameras, IP telephones, wireless access points, switches, sensors, light controllers, and/or lights. Though FIG. 1 shows only three powered devices 50, 60, and 70, it is understood the system 90 is usable to power and control only a single device, two devices, or more than three devices.

In the conventional art, the switch 20 may receive AC power and may distribute the power to a plurality of ports 25 to power the aforementioned devices. In FIG. 1, the switch 20 is illustrated as including twelve ports 25 however it is understood that conventional switches 20 may include more than, or less than, twelve ports 25. Power from the ports 25 is delivered to the powered devices 50, 60, and 70 via conventional Ethernet cables 40.

In the conventional art, the switch 20 may include management software allowing the switch 20 to control how power is delivered to the powered devices 50, 60, and 70. For example, switch 20 may be configured to cycle power to the powered devices 50, 60, and 70. For example, in the event the devices 50, 60, and 70 are lights powered or controlled by the switch 20, the switch 20 may be configured to turn off the lights, or dim them, at times when they are not normally in use. In the alternative, the switch 20 may include a management port allowing an operator to configure the switch 20 or control the switch 20 to manage devices attached to the switch 20. For example, as shown in FIG. 1, the switch 20 may include a port allowing a user 10 to connect thereto to control the powered devices 50, 60, and 70 via the switch 20. In the conventional art, the switch 20 may alternatively be connected to a network which may be accessed by a user. In this latter embodiment, the user may have access to the switch 20, and may control the switch 20 via software that may run on the network or may run on a computer the user operates.

SUMMARY

The inventor has noted that a drawback associated with conventional PoE lighting systems is the potential for lights to either deactivate or simply refuse to turn on in the event a controller, for example, a switch, goes offline. This could present a serious safety issue for occupants of a building who may require light to exit a building. As such, the inventor set out to design a new and nonobvious type of node having an ability to control a device, for example, a light or an alarm, when a controller goes offline.

In accordance with example embodiments, a node may include a microprocessor configured to control a powered device based on data received from a controller and, in the event data communication between the controller and the microprocessor is interrupted or lost, control the powered device independent of the controller.

BRIEF DESCRIPTION OF THE DRAWINGS

Example embodiments are described in detail below with reference to the attached drawing figures, wherein.

DETAILED DESCRIPTION

Figure 1:
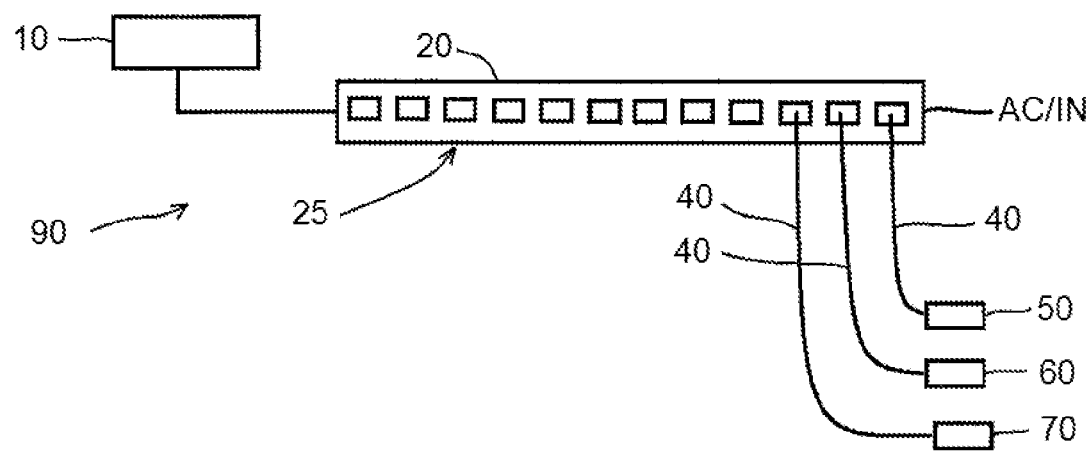
FIG. 1 is a view of a conventional system employing PoE.

Example embodiments will now be described more fully with reference to the accompanying drawings. Example embodiments are not intended to limit the invention since the invention may be embodied in different forms. Rather, the example embodiments are provided so that this disclosure will be thorough and complete, and will fully convey the scope of the invention to those skilled in the art. In the drawings, the sizes of components may be exaggerated for clarity.

In this application, when an element is referred to as being "on," "attached to," "connected to," or "coupled to" another element, the element may be directly on, directly attached to, directly connected to, or directly coupled to the other element or may be on, attached to, connected to, or coupled to any intervening elements that may be present. However, when an element is referred to as being "directly on," "directly attached to," "directly connected to," or "directly coupled to" another element or layer, there are no intervening elements present. In this application, the term "and/or" includes any and all combinations of one or more of the associated listed items.

In this application, the terms first, second, etc. are used to describe various elements and components. However, these terms are only used to distinguish one element and/or component from another element and/or component. Thus, a first element or component, as discussed below, could be termed a second element or component.

In this application, terms, such as "beneath," "below," "lower," "above," "upper," are used to spatially describe one element or feature's relationship to another element or feature as illustrated in the figures. However, in this application, it is understood that the spatially relative terms are intended to encompass different orientations of the structure. For example, if the structure in the figures is turned over, elements described as "below" or "beneath" other elements would then be oriented "above" the other elements or features. Thus, the term "below" is meant to encompass both an orientation of above and below. The structure may be otherwise oriented (rotated 90 degrees or at other orientations) and the spatially relative descriptors used herein interpreted accordingly.

Example Embodiments are illustrated by way of ideal schematic views. However, example embodiments are not intended to be limited by the ideal schematic views since example embodiments may be modified in accordance with manufacturing technologies and/or tolerances.

The subject matter of example embodiments, as disclosed herein, is described with specificity to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other technologies. Generally, example embodiments relate to a node and a method of controlling devices connected to the node. In example embodiments the devices may be, but are not required to be, lights and/or alarms.

Figure 2:
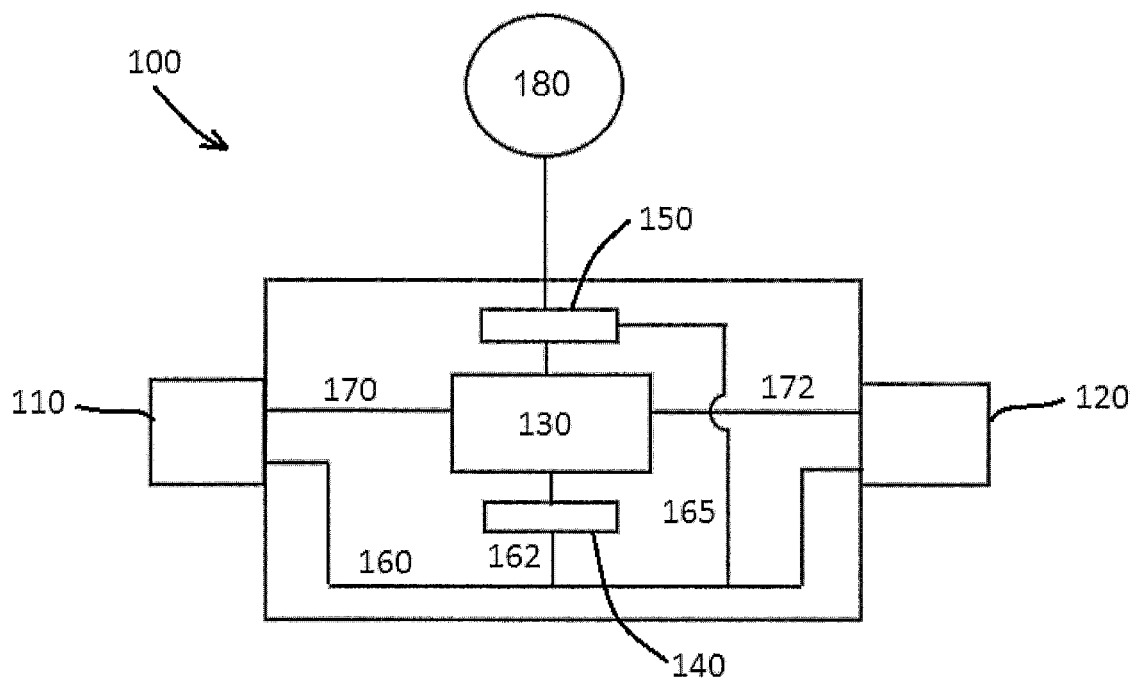
FIG. 2 is a view of a node in accordance with example embodiments.

FIG. 2 is a view of a node 100 in accordance with example embodiments. As shown in FIG. 2, the node 100 may include an input port 110 and an output port 120. In example embodiments, each of the input port 110 and the output port 120 may be configured to receive a conventional PoE cord 40. Thus, the node 100 may be capable of receiving both data and power over PoE. For example, in one nonlimiting example embodiment, the input port 110 and the output port 120 may be, but is not required to be, configured as a RJ45 connector standardized as an 8P8C modular connector.

In Example embodiments, the node 100 may include a microprocessor 130. The microprocessor 130 may be configured to receive data from the input port 110, control a powered device 180 connected to the node 100, transmit data to the output port 120, receive data from the output port 120, and transmit data to the input port 110. Thus, in example embodiments, data may flow in two directions through the node 100.

In FIG. 2, the node 100 may include a first power source 140 configured to provide power to the microprocessor 130 and a second power source 150 configured to provide power to the powered device 180. In example embodiments, the first and second power sources 140 and 150 may be configured to receive power via conductive lines 160, 162, and 165 which may receive power from the input port 110. For example, when an Ethernet cable 40 is inserted into the input port 110, power may flow to the first power source 140 via the conductive lines 160 and 162 and may also flow to the second power source 150 via conductive members 160 and 165. In example embodiments, the conductive member 160 may terminate at the output port 120. Thus, in example embodiments, power may also flow from the input port 110 to the output port 120 via the conductive member 160.

In FIG. 2, the microprocessor 130 may receive data from the input port 110. For example, in example embodiments, the microprocessor 130 may receive data via a conductive member 170. In example embodiments, the microprocessor 130 may use the data to control the powered device 160. In addition, or in the alternative, the microprocessor 130 may transfer the data to the output port 120 via another conductive member 172. In example embodiments, the microprocessor 130 may also be configured to receive data from the output port 120 and transfer this data to the input port 110. Thus, in example embodiments, data may flow two ways across the node 100.

Figure 3A:
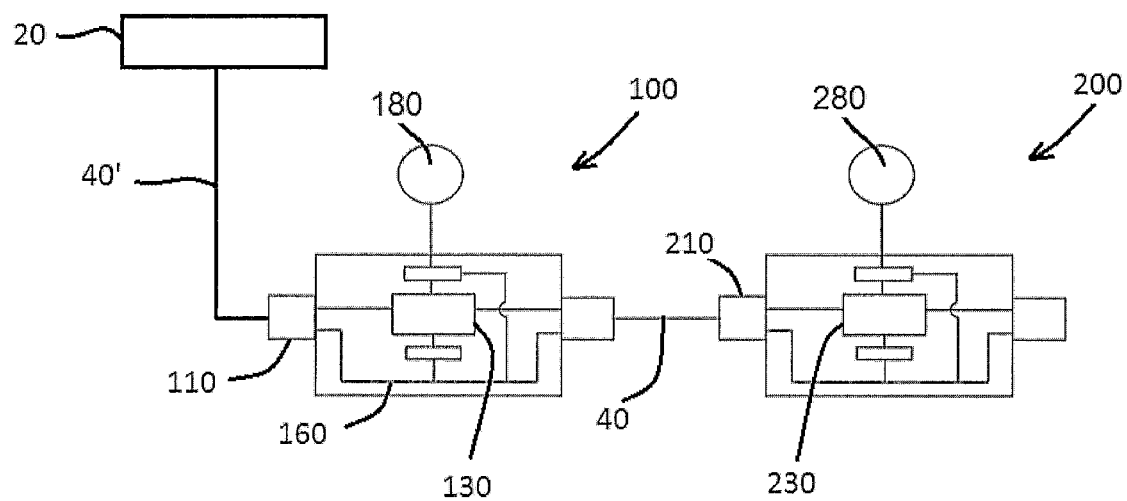
FIGS. 3A and 3B are views of connected nodes in accordance with example embodiments.

FIG. 3A illustrates two nodes 100 and 200 connected to one another. Because node 200 may be substantially identical to node 100, a detailed description thereof is omitted for the sake of brevity. In example embodiments, power and data may be provided to the input port 110 of node 100. For example, the input port 110 of node 100 may be connected to a conventional switch 20 via a PoE cable 40'. In example embodiments, the power from the switch 20 may flow along the conductive member 160 to the output port 120 and through the PoE cable 40 to the input port 210 of the second node 200. Thus, in example embodiments, power provided to the input port 110 may be used to power each of the first and second nodes 100 and 200. Similarly, data provided to the first port 110 may be provided to the processor 130 of the first node 100 and to the processor 230 of the second node 200. This data may allow the first node 100 to control the first powered device 180 and/or allow the second node 200 to control a second powered device 280. Also, in example embodiments, data may flow from the second node 200 to the first node 100 via the PoE cable 40 and from the first node 100 to the switch 20 via the PoE cable 40'.

Figure 3B:
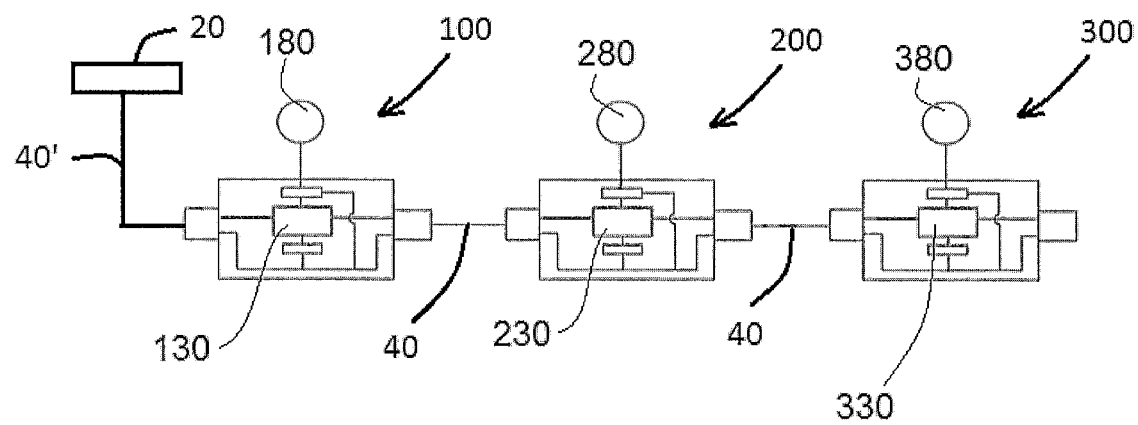

FIG. 3B illustrates three nodes 100, 200, and 300 connected to one another. In example embodiments the second and third nodes 200 and 300 may be substantially identical to the first node 100 and the principles associated with FIG. 3A apply to FIG. 3B. In other words, power and data from a switch 20 may flow to the input port 110 of the first node and the power and data may be provided to the second and third nodes 200 and 300 via PoE cables 40. Also, data may flow from the first node 100 to the second node 200 and then the third node 300 and may also flow from the third node 300 to the second node 200, from the second node 200 to the first node 100, and from the first node 100 to the switch 20.

In example embodiments the microprocessors 130, 230, and 330 may control the powered devices 180, 280, and 380 based on data received from the switch 20, however, it is conceivable that the switch 20, or any other device which is configured to control any one of, or all of, the nodes 100, 200, and 300 may go offline thus interrupting data communication between the nodes and the switch 20. This could potentially cause a safety concern where the powered devices 180, 280, and 380 are lights. As such, the microprocessors 130, 230, and 330 may be configured so that if communication between the controller (for example, switch 20) and any one of, or all of, the nodes 100, 200, and 300 is interrupted, the microprocessors 130, 230, and 330 will automatically control their respective powered devices 180, 280, and 380. For example, in the event the powered devices 180, 280, and 380 are lights, the lights may be controlled to a certain dim level by their respective microprocessors. This would assure that persons in a room requiring light which is normally controlled by a switch 20 receive light in the event the switch 20 goes off line.

Figure 4:
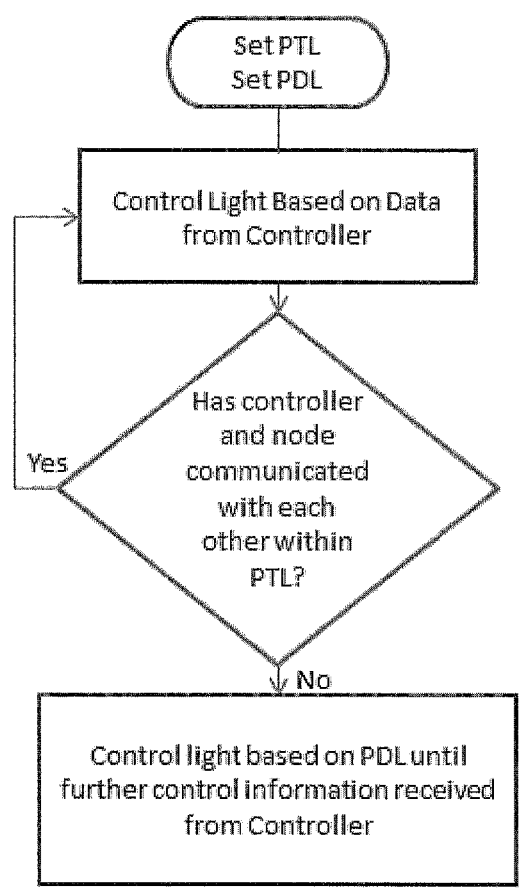
FIG. 4 is a view of a method in accordance with example embodiments.

FIG. 4 is a view of a flowchart illustrating an example of the above mentioned method. For example, in FIG. 4 a predetermined time limit (PTL) and a predetermined dim level (PDL) may be set by a user and stored in some form of electronic memory, for example, an electronic database which is accessible by the microprocessor. The electronic database, for example, may be, but is not required to be, and electronic storage medium such as ROM, PROM, EPROM, or an EEPROM.

In this application PTL and PDS are examples of control parameters a node may use to control a powered device. The PTL and PDL may be set (or stored), for example, when a node is initially fabricated. In the alternative, the PTL and PDL may be set by a user. The PTL, for example, may be any time limit desired by a user. For example, in one embodiment the PTL may be one minute, in another embodiment it may be two minutes. Similarly, the PDL may also be any level desired by a user. For example, in one embodiment, the PDL may be 100%, in another embodiment, the PDL may be about 50%.

The method of FIG. 4 may, for example, be executed by the microprocessor 130 of node 100, however, it could similarly be executed by the microprocessors 230 and/or 330 of nodes 200 and 300. As shown in FIG. 4 the microprocessor 130 may control light based on data from a controller, for example, the switch 20. The microprocessor 130 may, thereafter, monitor whether or not the node 100 has communicated with the controller within PTL. If not, the microprocessor 130 may control the powered device 180. For example, if the powered device 180 is a light, the light may be controlled by the microprocessor 130 to a dim level of 5 PDL.

Example embodiments are not intended to be limited by the aforementioned examples. For example, the electronic memory may store additional control parameters. For example, as alternative to storing a PDL the electronic memory may store a script which may be executed in the event the PTL is exceeded. For example, the powered device 180 may be an LED light capable of producing any number of colors. In this embodiment the microprocessor 130 may cause the LED light to emit a particular color or change from one color to another color in the event the PTL is exceeded. As yet another example, rather than causing a light to change color it might alternatively cause a light to blink. Of course, the node 100 may be configured to execute other actions. For example, in another embodiment the powered device 180 may be an alarm and the node 100 may be configured to send power to the alarm in the event the PTL is exceeded. The alarm, for example, may be an audio alarm and/or a vibration device.

Example embodiments of the invention have been described in an illustrative manner. It is to be understood that the terminology that has been used is intended to be in the nature of words of description rather than of limitation. Many modifications and variations of example embodiments are possible in light of the above teachings. Therefore, within the scope of the appended claims, the present invention may be practiced otherwise than as specifically described.

What I claim is:

1. A node comprising:
   an electronic memory configured to store at least one of a dim value and a script; and
   a microprocessor configured to control a powered device based on data received from a controller, wherein if the node does not receive a communication from the controller within a predetermined time limit, the microprocessor independently controls the powered device by at least one of executing the script and controlling the powered device to have a dim level based on the dim value.

2. The node of claim 1, wherein the node includes a port configured to interface with an Ethernet cable.

3. The node of claim 1, wherein an electronic database stores a time value upon which the time limit is based.

4. The node of claim 1, wherein the powered device is a light.

5. The node of claim 4, wherein the microprocessor is configured to control the light independent of the controller after the data communication between the controller and the microprocessor is interrupted for more than the time value and control the light based on the dim value.

6. The node of claim 5 wherein the controller going offline is the event when data communication between the controller and the microprocessor is interrupted.

7. A system comprising:
   the node of claim 1;
   the controller; and
   the powered device.

8. The system of claim 7, wherein the node includes a port configured to interface with an Ethernet cable.

9. The system of claim 7, wherein the node includes an electronic database for storing at least one control parameter.

10. The system of claim 9, wherein the at least one control parameter includes a time value.

11. The system of claim 10, wherein the powered device is a light.

12. The system of claim 11, wherein the microprocessor is configured to control the light independent of the controller after the data communication between the controller and the microprocessor is interrupted for more than the time value and control the light based on the dim value.

13. The system of claim 12, wherein the controller going offline is the event when data communication between the controller and the microprocessor is interrupted.

* * * * *